United States Patent
Amri

(10) Patent No.: US 10,915,709 B2
(45) Date of Patent: Feb. 9, 2021

(54) VOICE-CONTROLLED SYSTEM

(71) Applicant: Masoud Amri, Berlin (DE)

(72) Inventor: Masoud Amri, Berlin (DE)

(*) Notice: Subject to any disclaimer, the term of this patent is extended or adjusted under 35 U.S.C. 154(b) by 85 days.

(21) Appl. No.: 16/096,840

(22) PCT Filed: Apr. 6, 2017

(86) PCT No.: PCT/EP2017/058239
§ 371 (c)(1),
(2) Date: Oct. 26, 2018

(87) PCT Pub. No.: WO2017/186469
PCT Pub. Date: Nov. 2, 2017

(65) Prior Publication Data
US 2019/0121854 A1 Apr. 25, 2019

(30) Foreign Application Priority Data

Apr. 28, 2016 (DE) .................. 10 2016 107 892
Aug. 17, 2016 (DE) .................. 10 2016 115 243

(51) Int. Cl.
*G06F 40/30* (2020.01)
*G10L 15/22* (2006.01)
*G10L 25/48* (2013.01)

(52) U.S. Cl.
CPC .......... *G06F 40/30* (2020.01); *G10L 15/22* (2013.01); *G10L 25/48* (2013.01)

(58) Field of Classification Search
CPC .......... G06F 40/30; G10L 15/22; G10L 25/48
See application file for complete search history.

(56) References Cited

U.S. PATENT DOCUMENTS 5,634,024 A * 5/1997 Yamaguchi ............... G06F 8/00
712/200
5,774,860 A * 6/1998 Bayya ...................... G10L 15/22
700/246

(Continued)

FOREIGN PATENT DOCUMENTS

CN    101196883        6/2008
JP    03004331 A  *   1/1991

(Continued)

OTHER PUBLICATIONS

McTear, M.F., "Spoken dialogue technology", ACM Computing Surveys, 34:1, Mar. 2002, pp. 90-169.

(Continued)

*Primary Examiner* — Mohammad K Islam
(74) *Attorney, Agent, or Firm* — Ray Quinney & Nebeker P.C.; Paul N. Taylor

(57) ABSTRACT

A method for controlling a system using natural language comprises a step of providing a plurality of string programme code components within the system. A string programme code component each comprises a definition string comprising an expression in natural language, and a programme code segment unambiguously assigned to the definition string which implements a functionality assigned to the expression in natural language. At least one of the string programme code components from the plurality of string programme code components further comprises a process for parameter input, wherein this string programme code component is configured to support a parameter input by means of which the functionality provided by the programme code segment of this string programme code component may be specified.

13 Claims, 4 Drawing Sheets

(56) References Cited

U.S. PATENT DOCUMENTS

| | | | |
|---|---|---|---|
| 6,374,226 B1 | 4/2002 | Hunt et al. | |
| 7,930,168 B2 | 4/2011 | Weng et al. | |
| 9,110,659 B2 | 8/2015 | Chappel | |
| 9,324,025 B2* | 4/2016 | Byron | G06F 40/55 |
| 9,430,461 B2* | 8/2016 | Baughman | G06F 40/284 |
| 9,583,104 B2* | 2/2017 | Landry | G06F 3/167 |
| 10,052,769 B2* | 8/2018 | Houssin | B25J 11/001 |
| 10,621,978 B2* | 4/2020 | Zamora Duran | G06N 3/006 |
| 2005/0005266 A1* | 1/2005 | Datig | G06N 5/02 |
| | | | 717/136 |
| 2008/0052672 A1 | 2/2008 | Tatsumi | |
| 2008/0307388 A1 | 12/2008 | Ralls et al. | |
| 2010/0103776 A1* | 4/2010 | Chan | H04R 3/005 |
| | | | 367/119 |
| 2012/0206565 A1* | 8/2012 | Villmer | H04N 5/23258 |
| | | | 348/36 |
| 2013/0218339 A1* | 8/2013 | Maisonnier | B25J 13/003 |
| | | | 700/257 |
| 2014/0222436 A1* | 8/2014 | Binder | G10L 21/16 |
| | | | 704/275 |
| 2014/0359585 A1* | 12/2014 | Marvie | G06F 8/44 |
| | | | 717/139 |
| 2015/0220852 A1* | 8/2015 | Hatami-Hanza | G06F 16/9535 |
| | | | 706/12 |
| 2016/0210427 A1* | 7/2016 | Mynhier | G16H 50/20 |
| 2018/0039829 A1* | 2/2018 | Summers | G06K 9/00469 |
| 2018/0061421 A1* | 3/2018 | Sarikaya | G10L 17/06 |
| 2018/0122209 A1* | 5/2018 | Jefferson | A61B 5/0015 |
| 2018/0167648 A1* | 6/2018 | Lee | G11B 27/00 |
| 2018/0232405 A1* | 8/2018 | Samara | G06F 16/212 |
| 2018/0322036 A1* | 11/2018 | Alam | G06F 11/3688 |
| 2019/0066000 A1* | 2/2019 | Veloz | G06Q 10/02 |
| 2019/0156821 A1* | 5/2019 | Zamora Duran | G06F 3/16 |

FOREIGN PATENT DOCUMENTS

| | | | |
|---|---|---|---|
| WO | WO 2009/127481 | 10/2009 | |
| WO | WO-2011003628 A2 * | 1/2011 | B25J 9/1656 |

OTHER PUBLICATIONS

International Search Report for PCT/EP2017/058239 dated Feb. 11, 2017, 2 pages.

* cited by examiner

VOICE-CONTROLLED SYSTEM

CROSS REFERENCE TO RELATED APPLICATIONS

This application is a U.S. Nationalization of PCT Application Number PCT/EP2017/058239, filed on Apr. 6, 2017, which claims priority to German Patent Application No. 10 2016 107 892.1, filed on Apr. 28, 2016, and German Patent Application No. 10 2016 115 243.9, filed Aug. 17, 2016, the entireties of which are incorporated herein by reference.

The invention relates to a process for controlling or programming a system using natural language as well as a system configured accordingly.

TECHNOLOGICAL BACKGROUND

In relation to technical systems which operate in human environment and interactively communicate with humans, issues occur, the complexity of which do not permit any general solution on the basis of simple algorithms. One example would be the control of humanoid robots. The technical problems occurring and the amount of solution possibilities for handling these problems are comprehensive such that they may only be managed by involving a large group of experts.

A voice-based control of technical systems and technical applications is known, for example in relation to applications on mobile devices or in the event of robot control.

Furthermore, methods for programming in natural language have been the object of research and development for many years, particularly in relation to a human-machine-communication. Users which are not particularly trained regarding programming should also have the possibility to control technical systems using natural language.

Issues often result from the fact that natural language is ambiguous and the understanding is often based on context information which is not always explicitly or directly present. Furthermore, people tend to think procedurally, whereas current software is rather object-oriented which may be difficult to understand by a normal user.

The object of the present invention is to take account of the problems mentioned previously and to further improve and facilitate a control or programming of technical systems using natural language.

SUMMARY OF THE INVENTION

This object is solved by a method, system and data structure with the features of the associated claims. Preferred designs and further developments are defined in the dependent claims.

The present invention is essentially based on a specific data structure which is designated as string programme code component in relation to the present invention. This data structure comprises a definition string on the one hand which comprises an expression in natural language.

On the other hand, the string programme code component comprises a programme code segment unambiguously assigned to the definition string which implements a functionality assigned to the expression in natural language.

The definition string and the programme code segment are inseparably coupled to each other and form a functional unit. The programme code segment implements the semantics of the definition string, i.e. the one that is specified by the expression in natural language.

The term "expression in natural language" is to be understood in relation to the present invention in a way that the expression comprises one or more words in natural language. The expression may only comprise one or two words in their basic form. However, the expression preferably comprises a grammatically correct sentence in natural language. Intermediate forms are possible as well.

Such a data structure, i.e. a string programme code component according to the invention, provides a functional unit which is complete and substantially enclosed. The internal implementation of the string programme code component to outside may be hidden. As described in detail below, the string programme code component may easily be integrated into a system, for example using plug-and-play, and retrieved using natural language. In this way, the system may optionally be enhanced and amended by third parties. The need for a specification of the string programme code component is limited to a minimum. For programming the programme code segment, for example, common programming languages, such as Java or C++, may be provided.

Thus, a preferred embodiment of a method for controlling a system using natural language particularly comprises the step of providing a plurality of string programme code components previously described within the system.

According to a preferred embodiment of the invention, at least one of a plurality of string programme code components previously described is further developed to support a parameter input by means of which the functionality provided by the programme code segment of this string programme code component may be specified.

Said another way, the functionality which implements a programme code segment of a string programme code component may not be fixed and unchangeable but may be specified using parameter inputs. A basic functionality implemented, for example, by the programme code segment for retrieving a data from a database may be specified using parameters regarding which table, and in the table, which columns are to be retrieved.

More specifically, at least one string programme code component may provide an own process for parameter input. If this string programme code component is processed by a control device of the system, the process for parameter input is retrieved and the string programme code component itself takes over the sensing of the required parameters.

According to an alternative embodiment, one of the string programme code components from the plurality of string programme code components may be configured to support a parameter input in way that a part of the definition string of this string programme code component for the control device of the system which processes the string programme code component is apparently characterised as a parameter to be specified. Here, technologies basically known in the field of software engineering which are connected with the terms "flag" or "annotation" may be used. In this case, sensing of the parameter(s) is performed by the control device based on a specific labelling in the definition string of the string programme code component. It should be understood that the realisation of the term "flag" used in this document is not only limited to the technologies basically known in the field of software engineering, such as Annotation, XML, JSO and the like. Here, new technologies which serve the same purpose as "flag" may be used. This also implies the use of reserved key words in the source code of a programming language and by the respective compiler or interpreter.

According to an implementation, a freely definable parameter type may be assigned to a parameter, by means of which the functionality provided by the programme code segment of a string programme code component may be specified. Such a parameter type may particularly be different from a known primitive type from conventional programming languages, such as string, integer, float, date, boolean, etc. In this context, parameter types may particularly be units of measure or the like. Even freely definable categories, such as "vegetables", may be provided as a parameter type. Furthermore, it is possible to define and assign a parameter type which consists of a combination of one or more "default parameters" and one or more freely definable parameters. For a parameter which indicates a temperature, for example, a parameter type may be defined which comprises a floating-point number (float) and a particular unit of measure (degrees Celsius).

The fact that the parameter identification is made on the part of the system—or preferably on the part of the string programme code component itself, using the process for parameter previously described—has the further advantage that wrong inputs, such as regarding the type or value of the parameter, may be checked directly during the input. The provision of specific, freely definable parameter types may be helpful, such as, when a parameter represents a number but the associated unit of measure which may be assigned as an additional parameter type is essential (e.g. "m" or "km"). An error due to a wrong parameter input which would otherwise have been occurred later, e.g. during runtime, may thus be recognised early and captured. A parameter input, identification and verification using a specific process of a string programme code component is particularly advantageous. The process may specifically be adapted to the programme code of the string programme code component; the system does not have to be adapted. Each programmer may add the process adapted to the respective string programme code component to the parameter input and adapt it specifically to the requirements of the programme code of the respective string programme code component.

The provision of an additional, freely definable parameter type as a further advantage: It will be possible to input different parameters, with different parameter types assigned to, in any order. A correct assignment may then be made on the part of the process for parameter input or, respectively, on the part of the system, only based on the parameter type.

For verifying a parameter type during the input, pattern matching methods described below in more detail may be used, which are used generally when comparing an input string to a definition string of a string programme code component.

According to a preferred embodiment, a functionality provided by the programme code segment of at least one of the string programme code components from the plurality of string programme code components may supply a return value. Return values may be simple logical or numerical values, strings or the like but also complex structures or even functionalities.

Such a return value may be flagged or annotated with a flag in natural language and stored by the system in a specifically designated storage area. To some extent, the values stored in this area represent a kind of history or memory. Due to the flag, stored return values may easily be accessed in an unambiguous manner on the part of a string programme code component using natural language. Thus, there is the possibility to create, store and easily and unambiguously use context.

A freely definable return value type may be assigned to a return value, as well as to a parameter, which characterises the return value, e.g., regarding an assigned unit of measure.

As described in more detail below with regard to control structures, a second string programme code component may access the return value of a first string programme code component, particularly as a parameter for specifying the functionality provided by the programme code segment of the second string programme code component. Particularly preferably, this procedure may be used in connection with conditional statements which may access return values of previous string programme code components.

According to a first preferred embodiment, the system is configured to execute the functionality implemented by the programme code segment upon receiving an input string which generally comprises an expression in natural language if the input string has a specified similarity to the definition string of the string programme code component according to a specified degree of similarity. In simple terms, the functionality of the string programme code component may be retrieved by receiving a natural-language input by the system which substantially corresponds to the definition string of the string programme code component.

For the degree of similarity for comparing an input string to the definition string of the string programme code component, degrees of similarity known in the prior art may be used. The same applies to a method for comparing an input string to the definition string; here, several methods are known in the prior art, for example conventional pattern-matching methods. The specified similarity, which may be indicated using a numerical value between 0 and 1 depending on the degree of similarity used, may vary depending on the type for receiving the input string by the system. The input using a voice input and conversion into a string or the direct input of a string, for example using a keyboard or the like, are to be distinguished. Specific degrees of similarity or comparison methods are not the subject matter of the present invention. In the simplest case, the input string may be analysed as to whether it exactly or approximately comprises a specified part of the expression in natural language of the definition string. Exactly means word identity. Approximately may mean that grammatical deviations (e.g. singular/plural, case, conjugation, etc.) are permissible and, e.g., punctuation marks such as comma or the like may be ignored. Synonymous words or terms may be regarded as similar.

According to an embodiment, the programme code segment of a string programme code component implements a functionality for controlling a device coupled to the system. A preferred application is the control of domestic devices. A further preferred application is the control of a robot or the like. Furthermore, it is conceivable that a search for information, for example in public online libraries, using the method described herein is facilitated.

According to a further embodiment, the process for parameter input implements a dialogue between the string programme code component and a user. Alternatively, the dialogue may also be implemented by the programme code segment of the string programme code component. That is, the process for parameter input or, respectively, the functionality which is implemented by the programme code segment creates an output in natural language the user understands as a question or prompt. The user answers this question using a respective input which may be received and processed by the process or, respectively, the functionality as a further input string. This question-answer sequence may be repeated several times. By doing so, the string programme code component may refer to previous inputs from the user for controlling the dialogue in a way described below. For example, this embodiment is suitable for providing an expert system.

According to a first variant, the dialogue of a parameter input may also serve for specifying the functionality implemented by the programme code segment. Such a parameter input may be designed such that the indicated parameters are verified regarding an expected parameter type, parameter value or the like on the part of the functionality or the process for parameter input. Thus, wrong inputs may be identified and prevented.

According to a second variant, the dialogue may support a free conversation between the user and the system. In this context, a free conversation means a change between a question or prompt by the functionality to the user and an answer indicated by the user, wherein the answer is limited neither regarding the format nor the semantics. The answer of the user is made via the input of an input string into the system which transmits this input string to the functionality of the string programme code component. Typically, this input string will also comprise an expression in natural language.

According to a further embodiment, the programme code segment of the string programme code component implements a functionality for verifying an input string to the system. Said another way, the functionality of the string programme code component itself creates an input for the system which may result to retrieving a further string programme code component which has already been provided in the system.

At this point, a further advantage for the use of the string programme code component according to the invention can be seen. Each of these string programme code components may provide a specific functionality in an enclosed way which may be recognised and retrieved by the definition string of the respective string programme code component in natural language. Conventional systems which enable a voice control function are generally designed as closed systems and thus strongly limited regarding their complexity and expandability. However, a system according to the present invention is enabled to be expanded easily by adding a string programme code component to the system. Complex technical issues, such as knowledge presentation or the control of robots, may thus be improved in a distributed manner such that interested third parties provide individual aspects of the solving problem using specific string programme code components which may be added to the system. These string programme code components may then use the functionality of string programme code components already present and provide their own functionality for being retrieved by further string programme code components. Thus, a respective system is open and may be expanded easily in any direction.

Mainly responsible for this is the concept of the string programme code component. Conventional voice-controlled systems generally permit retrieving default functionalities already present, for example beginning an Internet search, sending a message, entering an appointment into a calendar or the like. Within the scope of the present invention, any functionality using the programme code segment and adapted to the definition string in natural language may be provided and integrated into the system. While the voice control of the prior art only enhances the ergonomics of the respective system, a functionality is specifically provided herein using the programme code segment which implements the semantics of the expression in natural language which is contained in the definition string. The data structure of the string programme code component which is suggested herein thus permits a functional implementation of the semantics of natural-language expressions using an enclosed, functional unit of a natural-language expression and a programme code segment unambiguously and inseparably assigned to this expression.

It should be understood that a programme code segment of a string programme code component may simultaneously implement several of the functionalities described above.

Particularly, a programme code segment may implement the functionality of a dialogue as well as the functionality of transmitting an input string to the system. This is useful when it turns out during the dialogue that retrieving a further string programme code component with a further functionality based on the received inputs of the user is useful.

To some extent, the system supports an indirect communication of several string programme code components using natural language. According to a first aspect, a string programme code component, as described previously, may be configured to transmit an input string with an expression in natural language to the system and thus indirectly "retrieve" a further string programme code component, the definition string of which sufficiently corresponds to this input string. A further aspect of the communication of several string programme code components supported by the system using natural language will be apparent in the following.

Specifically, the method for controlling a system using natural language may comprise the following further steps:

The system receives an input string. The input string will generally comprise an expression in natural language.

In a further step, the system compares the input string to the definition string of a string programme code component already provided in the system according to the specified degree of similarity, for example using a conventional pattern-matching method.

If the input string has a specified similarity to the definition string according to the specified degree of similarity, the system executes the functionality implemented by the programme code segment.

According to a preferred embodiment, at least a portion of an input string received by the system may be stored. On the one hand, this may affect the input string which resulted in the execution of the functionality of the string programme code component. Alternatively or additionally, at least portions of input strings may be stored as well which have been input by the user as part of a dialogue with the string programme code component.

According to an embodiment, at least a portion of a received input string may be stored within a string programme code component itself. The string programme code component may additionally comprise a suitable context memory data structure. The information stored in the string programme code component are retrieved for supporting the subsequent execution of the functionality implemented by the programme code segment of the string programme code component by the string programme code component itself.

In this way, stored portions of input strings may be retrieved for supporting the subsequent execution of a functionality of a string programme code component. In this way, for example, a dialogue of the user may be controlled with a string programme code component while the string programme code component relies the history of the dialogue on stored and received information from the user during the dialogue.

Alternatively, portions of received input strings may also be stored centrally in the system. According to this variant, stored information (consisting of input string which generally comprises an expression in natural language) may also be used by a further string programme code component elaborated below as a form of context or background knowledge. The portions of input strings stored centrally in the system serve as short- or long-term memory of the system to which string programme code components each have access in an appropriate manner. Here, a second aspect of a communication of several string programme code components indirectly supported by the system using natural language can be seen clearly: A string programme code component may draw on natural-language information at the time of the execution of the functionality assigned to it, namely in the form of input strings previously stored in the system which have been stored during the execution of a functionality of a further string programme code component.

As mentioned previously, it is possible that a functionality implemented by the programme code segment of a string programme code component supplies a return value and, for example, stores it in the system such that string programme code components executed subsequently may have access to it. Such a return value may comprise an expression in natural language or be annotated using an expression in natural language. Even numerical or logical values may serve as return values; if these return values are annotated as natural language, they may be accessed easily using natural language, for example as a parameter of a string programme code component retrieved later.

According to a further embodiment, a functionality implemented by the programme code segment of a string programme code component may be configured to infer a context information from a received and stored input string and to store this context information within the system. Inferring the context information may, for example, be performed using data and/or inference rules prestored in the string programme code component. Thus, the context information is available for further string programme code components executed later as additional information base. The context information will preferably comprise an expression in natural language. To some extent, such a string programme code component is configured to draw a conclusion from an input string.

According to a first embodiment, a string programme code component may conventionally be created using a suitable programming language. This form of programming is generally selected to provide basic functionalities. This also includes simple control structures, such as conditional statements, loops, etc.

In other words, the programme code segment may implement a control structure controlling a sequence of a programme in at least one of the string programme code components from the plurality of string programme code components, such as a branching, a loop or a conditional statement. Basically, such control structures are implemented using programme code segments of string programme code components. As elaborated below, because control structures may be implemented in a generic or specific way using string programme code components, the method for controlling a system as well as a method described below for programming in natural language may basically provide the full functionality of a higher programming language.

The programme code segment of a string programme code component may, for example, implement a conditional statement, e.g. an IF statement. The condition which defines the conditional statement may be retrieved according to a first variant using the functionality implemented by the programme code segment of the string programme code component. In this way, very specific conditions may be implemented and retrieved easily.

This particularly relates to such conditions which may not or difficultly be captured using a rather generic form, e.g. "if a<b, then".

For example, a condition of the type "if it is light outside, then . . . " may be retrieved using a string programme code component, the programme code segment of which implements the functionality of the prompt of a brightness sensor mounted outside. For providing a control structure based on this condition, a code generator has only to create an IF statement when creating the programme code for the programme assigned to the programming string and enter an executeCodesegment( ) process, which retrieves the programme code segment of the string programme code component, as a condition of the IF statement.

According to a second variant, if the programme code segment of the at least one string programme code component implements a conditional statement, the condition defining the conditional statement may be defined by at least one operator and at least one operand. Said another way, in this case, the condition has a generic form of "Operand1 Operator Operand2", thus, e.g., "a<b". As the control structure, thus, e.g., an IF statement, is provided by a string programme code component in this case, the operands and the operator may be considered as parameters which may be captured during programming in natural language in a way described generally below. This may particularly be performed using the specific process for parameter capturing previously described which is provided by the string programme code component. This process may, for example, capture any numerical operand and suggest any common operator for selection. As shown below in more detail, return values of previous string programme code components may be selected as operands.

It should be understood that not only IF statements may be implemented using string programme code components but also any other conditional control structure, e.g. loops ("while", "for each", etc.). Compared to IF statements, the loop condition is reviewed with respect to loop control structures after the execution of the loop block. If it is still met, there will be a further loop iteration. It is possible that the loop condition will not be met after one or more loop iterations, for example, when the functionalities of string programme code components retrieved within the loop block change one or more values which are verified as part of the loop condition. A change of at least such a value may also be performed by the functionality of the string programme code component which implements the loop, for example by incrementing a loop counter. For example, the general form of a loop may be implemented as follows:

```
Loop loop_1 = new Loop( );
while ( loop_1.excecuteCodesegment( ) )    {
    // hier wird durch Codegenerator der
    // Source Code anderer Satzkomponenten eingetragen.
}
```

The "loop" class is a specific implementation of a string programme code component for realising a loop and may realise different variations of loops, such as "do while", "repeat", "for each" loops and the like.

Programming in natural language using string programme code components, such as explained below in detail, enables a result-controlled procedure in a similar manner. In other words, so-called "EventListeners" (event handling routines) may also be depicted using string programme code components. The same applies to a parallel processing of different procedures.

As shown below, the present invention enables programming only using natural language, i.e., to create further new string programme code components based on string programme code components already present. In this way, a novel programming using natural language is enabled, which requires hardly any programming experience and is thus open to a wide range of users. In combination with the general concept of the string programme code component, the expansion of existing systems is additionally facilitated.

According to an implementation, a method for programming in natural language comprises the following steps:

A plurality of string programme code components of the type previously described is provided, i.e. a string programme code component from the plurality of string programme code components each comprises a definition string which comprises an expression in natural language, and a programme code segment unambiguously assigned to the definition string which implements a functionality assigned to the expression in natural language.

In a further step, a programming string in natural language is input into a system which is configured to store and process the plurality of string programme code components.

The term of "programming string in natural language" designates, within the context of the present invention, as the term "expression in natural language" explained previously, generally an expression comprising one or more words in natural language. The words may be present in their basic form or the expression may comprise, at least partially, a grammatically correct sentence or a plurality of such sentences. This expression is called "programming string" because this expression, as described below, is used for programming, i.e. for creating a programme executable by a computing unit, and may thus be considered as "programme code" of a "programming language", wherein the programming language is the natural language within the context of the present invention.

During or after inputting the programming string, one or more string programme code components are selected from the plurality of the string programme code components if the programming string comprises at least one substring of the definition string of the string programme code component. Said another way, matches between the programming string and the definition strings of the string programme code components—based on the strings—are searched, and, if present, the respective string programme code components are selected. Said another way, the string programme code components are "retrieved" using the programming string.

It should be understood that it concerns natural language that a match of a part of the programming string with a substring of a string programme code component does not always have to be complete. It may be provided that such a match only has to exceed a predetermined threshold according to a specified degree of similarity. For the degree of similarity for comparing a programming string to the definition string of a string programme code component, degrees of similarity known in the prior art may be used, as described previously with regard to the first variant of a method according to the invention for controlling a system. The same applies to a method for comparing a programming string to the definition string; here, several methods are known in the prior art, for example conventional pattern-matching methods. The specified threshold, which may be indicated using a numerical value between 0 and 1 depending on the degree of similarity used, may vary. Specific degrees of similarity or comparison methods are not the subject matter of the present invention. In the simplest case, the programming string may be analysed as to whether it exactly or approximatively comprises a specified part of the expression in natural language of the definition string. Exactly means, e.g., word identity. Approximately may mean, for example, that grammatical deviations (e.g. singular/plural, case, conjugation, etc.) are permissible and, e.g., punctuation marks such as comma or the like may be ignored. Synonymous words or terms may be regarded as similar.

In a further method step, a programme assigned to the programming string is eventually created based on the programme code segment(s) of the at least one selected string programme code component.

A respective system for programming in natural language comprises a plurality of string programme code components described previously. The system further comprises an input device for inputting a programming string in natural language and a control device coupled to the input device.

The input device may comprise an editor which is configured to edit the programming string, particularly regarding the input or selection of parameters for specifying the functionality provided by the programme code segment of a selected string programme code component, as described below in more detail.

The control device is configured to store the string programme code components and to process the input programming string. The control device is further configured to select at least one of the string programme code components if the input programming string comprises at least one substring of the definition string of the string programme code component in the way described previously.

Further parts of the systems are, at least for a specified programming language, a code generator and a compiler which are configured to create a programme assigned to the programming string based on the programme code segments of at least one selected string programme code component.

This aspect of the present invention thus differs substantially from the prior art. There, it is often attempted to "understand" a natural-language input based on methods of the artificial intelligence, i.e. to analyse it linguistically and thus to understand the meaning of the input. In a further step, it is attempted to transmit this meaning into the programme code. The approach suggested herein does not basically depend on "understanding" but operates strictly deterministically—without the risk of a semantic misunderstanding of an input. The input programming string is not analysed linguistically or semantically but is compared only on the basis of a string comparison with the definition strings of the stored string programme code components. On the one hand, this requires hardly any computing time, and, on the other hand, may be implemented very easily.

The present invention has further advantages. The suggested approach is highly modular. The string programme code components are independent from each other. Various developers may create new string programme code components and add them to the system independently from each other, at different places and at different times. As shown below in more detail, new more complex string programme code components may be created easily using programming in natural language from simple string programme code components, the programme code segments of which implement a fundamental, strictly limited basic functionality, and added to the system.

The programme code segments of the string programme code components according to the present method approximately correspond to fundamental methods realised in machine language in higher programming languages. The more string programme code components the system comprises, and the more diverse they are, the bigger and more variable the possibilities for programming in natural language within the scope of the system previously suggested will get.

The main target direction of this aspect of the present invention is that users who do not have specific programming knowledge may create programmes using natural language on the basis of string programme code components provided by the developers. It is to be expected that the complexity of software systems in different fields of application may thus be reduced significantly, together with the development times and costs associated with it. New requirements or small changes of existing systems now basically require no change of a basic architecture which has probably been maintained for a long while and adapted several times but only the addition of one or the other string programme code component and the creation of additions based thereon—using programmes created easily using natural language. Furthermore, virtually no—basically very time-consuming—annotation of created programme codes is required as the programming is now performed using natural language and the programme is thus self-explanatory.

As mentioned previously, at least one of the selected string programme code components according to a preferred embodiment is configured to support a parameter input by means of which the functionality provided by the programme code segment of the selected string programme code component may be specified dynamically during programming in natural language. Preferably, this is performed using an own method for parameter input.

According to this embodiment, the method comprises a step of inputting at least one parameter for specifying the functionality provided by the programme code segment of the selected string programme code component. This step is performed during or after the input of the programming string and prior to the step of creating the programme assigned to the programming string.

A parameter input may be performed specifically in different ways, as previously described.

The method previously described may be used for programming conventional applications, for example for programming so-called apps for mobile devices. In the step of creating the programme assigned to the programming string, a programme code executable on a predetermined platform is created. As mentioned previously, the system may comprise code generators and compilers for any programming language and execution environment.

On the other hand, new string programme code components may be created based on string programme code components already present by programming in natural language, as described previously. This is accomplished by indicating a new definition string for the string programme code component to be created newly, and the several string programme code components are selected by inputting a suitable programming string in natural language in the way described previously. A new programme code segment for the string programme code component to be created newly is created based on a programme code which is created automatically in the step of creating the programme assigned to the programming string.

A preferred embodiment of a system which is configured for processing natural language comprises a plurality of string programme code components previously described which are integrated into the system. The string programme code components comprise, as mentioned, a definition string comprising an expression in natural language and a programme code segment unambiguously assigned to the definition string which implements a functionality unambiguously assigned to the expression in natural language. At least one of the string programme code components from the plurality of string programme code components comprises a process for parameter input, wherein this string programme code component is configured to support a parameter input by means of which the functionality provided by the programme code segment of this string programme code component may be specified.

The system is further configured according to an embodiment to execute the functionality implemented by the programme code segment upon receiving an input string which has a specified similarity to the definition string according to a specified degree of similarity.

As mentioned previously, the system may integrate any number of such string programme code components. These form enclosed and functional units and may thus be provided by independent developers and thus expand the functionality of the entire system. As also mentioned previously, it is possible that the functionality of a string programme code component retrieves the functionality of a further string programme code component by creating a respective input string and transmitting the input string to the system. Said another way, a string programme code component is retrieved by another string programme code component, not directly but always indirectly, via the system. Thus, there are no dependencies between individual string programme code components which have to be considered during implementation of a string programme code component. Each of the string programme code components may provide a specific solution for a specific sub-issue. By suitably combining the functionalities of different string programme code components, complex issues may thus be handled extensively. So far, missing functionalities may always be supplemented by integrating new string programme code components, without the necessity of changing the string programme code components already present or the system.

According to an embodiment, the system comprises a control device which is configured to receive an input string comprising an expression in natural language. The control device is further configured to compare the input string to a definition string of a string programme code component provided in the system according to the specified degree of similarity and to execute the functionality implemented by the programme code segment of the respective string programme code component in the event that the input string has the specified similarity to the definition string according to the specified degree of similarity.

According to a further embodiment, the system comprises an input device. The input device is configured to receive a user input in natural language, to infer an input string therefrom comprising an expression in natural language, and to send this input string to the control device. Such an input device may comprise, for example, a conventional voice recognition device which translates speech detected by a microphone to a respective string. Furthermore, an editor which permits an input using a Keyboard or the like may serve as an input device for the system.

The system may comprise another class of input devices according to an embodiment which are configured to receive an environment signal, e.g., using a sensor, to infer an input string therefrom comprising an expression in natural language, and to send this input string to the control device of the system. More general, an input device may be provided which is configured to receive any specified trigger signal, to infer an input string dependent from the trigger signal which comprises an expression in natural language, and to send the input string to the system. The trigger signal may be an environment signal which, for example, indicates a change of the environment (e.g. regarding brightness, heat, noise, etc.). Alternatively, such a trigger signal may also be sent out by the system in order to excite the input device to create an input string which, for example, describes a current system state of the input device (e.g. "on/off" in the event of a lighting device; "open/closed" in the event of a window, etc.).

Here, a further feature of the system described herein can be seen. Not only a human user but also technical devices communicate as a user with the control device of the system on the basis of expressions in natural language. The control device of the system does not distinguish between an input from a human user and an input from a user in the form of a technical device but processes the received input string comprising an expression in natural language identically. For example, an input device may be provided which captures temperature, brightness, humidity, noise or similar environment parameters, describes them in natural language and send them to a control device of the system. In response, the system may retrieve a respective string programme code component and thus, for example, control a functionality of the retrieving device and/or another device.

The system may further comprise an output device which is configured to output an output signal for a user in natural language in order to support a dialogue between the user and a string programme code component. The output device may provide particularly a conventional speech output via a speaker or the like. Even a text output via a display or the like is possible. It is understood that the system may also comprise a combined input and output device.

As mentioned several times, the system may comprise technical devices of any kind which are configured to be controlled using a functionality implemented by a programme code segment of a string programme code component. The method described is particularly suitable for controlling robots. Even the control of domestic devices or other consumer electronic devices may be performed using the method described. Furthermore, a method described previously may be used for implementing an expert system. Particularly by easily implementing string programme code components by different users into the system, different areas of knowledge which are covered by the individual users may be connected easily in order to easily combine the different areas of knowledge which were separated previously.

BRIEF DESCRIPTION OF THE FIGURES

Below, the invention is explained by way of example with regard to the figures attached based on some example embodiments. In the figures.

DETAILED DESCRIPTION OF THE INVENTION

Figure 1:
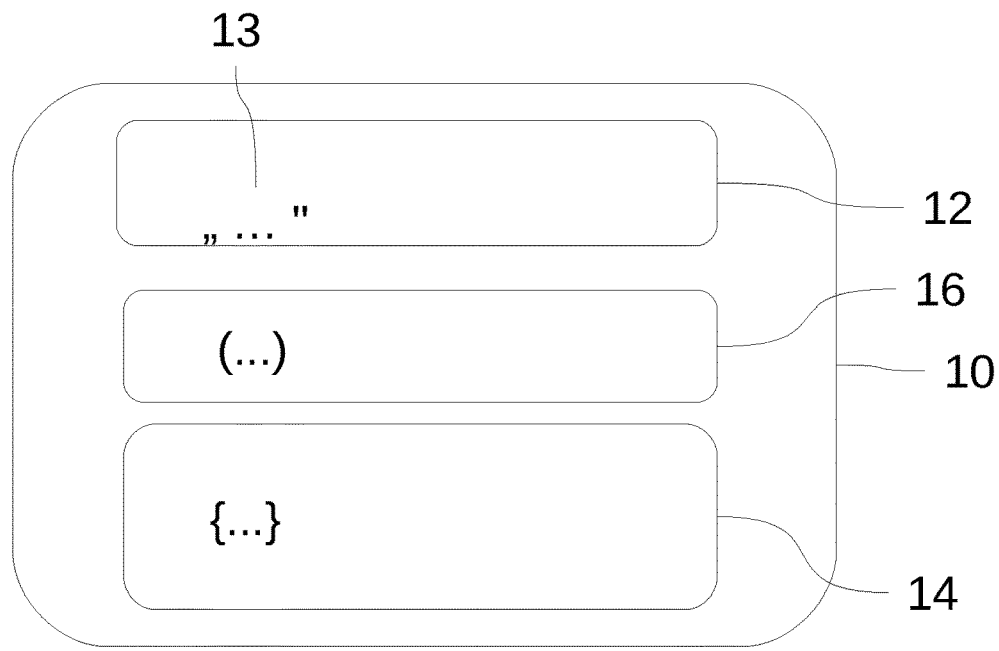
FIG. 1 schematically shows a preferred embodiment of a data structure according to the invention.

FIG. 1 schematically shows a preferred embodiment of a data structure 10 in the form of a string programme code component 10. The string programme code component comprises a definition string 12 comprising an expression 13 in natural language. Furthermore, the string programme code component comprises a programme code segment 14 which implements a functionality assigned to the expression 13 in natural language. Eventually, the string programme code component comprises a method 16 for parameter input.

A string programme code component 10 forms an inseparable, enclosed unit, consisting of the definition string 12 with the expression 13 in natural language and the programme code segment 14 which realises the meaning of the natural-language expression 13. The string programme code component is technically realised as one component which hides its inner implementation towards outside. The inner implementation consists, e.g., of a method body which realises the programme code segment 14 or the string programme code component 10. The definition string 12 serves as a docking point for an input string in natural language for retrieving the functionality of the string programme code component 10, as described below in more detail with regard to FIG. 3. Thus, a string programme code component 10 always represents a complete unit highly enclosed and functional. The string programme code component 10 may be integrated using plug-and-play in a known way into a system 100 (see FIG. 2).

A string programme code component 10 may be provided using a conventional programming language, as shown below using the example C++.

For implementing a string programme code component 10, an abstract class is defined in C++ which serves as basic class for the specific string programme code components 10:

```
class Zeichenketten-Programmcode-Komponente {
    public string getSentence( ) = 0;
    public void collectParameter( ) = 0;
    public ResultObject executeCodesegment ( ) = 0;
}
```

The specific string programme code components then implement this abstract class.

As an example, the class "MyCPlusPlusAddition" is realised for the definition string with the natural-language expression of "Add a number to another number". The process getSentence( ) returns an expression in natural language.

```
class MyCPlusPlusAddition : Zeichenketten-Programmcode-Komponente
{
    public string getSentence( ){
        return " Addiere eine Zahl zu einer anderer Zahl";
    };
    public void collectParameter( ... ) {
        ... some code;
    };
    public Object executeCodesegment ( ){
        ... some code;
    };
}
```

In the present example, the process collectParameter( . . . ) is used to collect the required functional parameters which are required for the execution of the code segment. An input parameter may be verified regarding its correctness concerning the expected parameter type in order to prevent wrong inputs. In the present example, it may be verified, for example, as part of the process collectParameter( . . . ) that exactly two parameters in the form of numerical values are input, and not any string.

The process executeCodesegment( ) is used to implement the actual functionality of the string programme code component 10, namely the addition of two numbers.

It should be understood that the concept of a string programme code component described above as an example may not only be realised in C++ but using any conventional programming language, such as PHP, Visual Basic, C#, Objective-C or similar.

Figure 4:
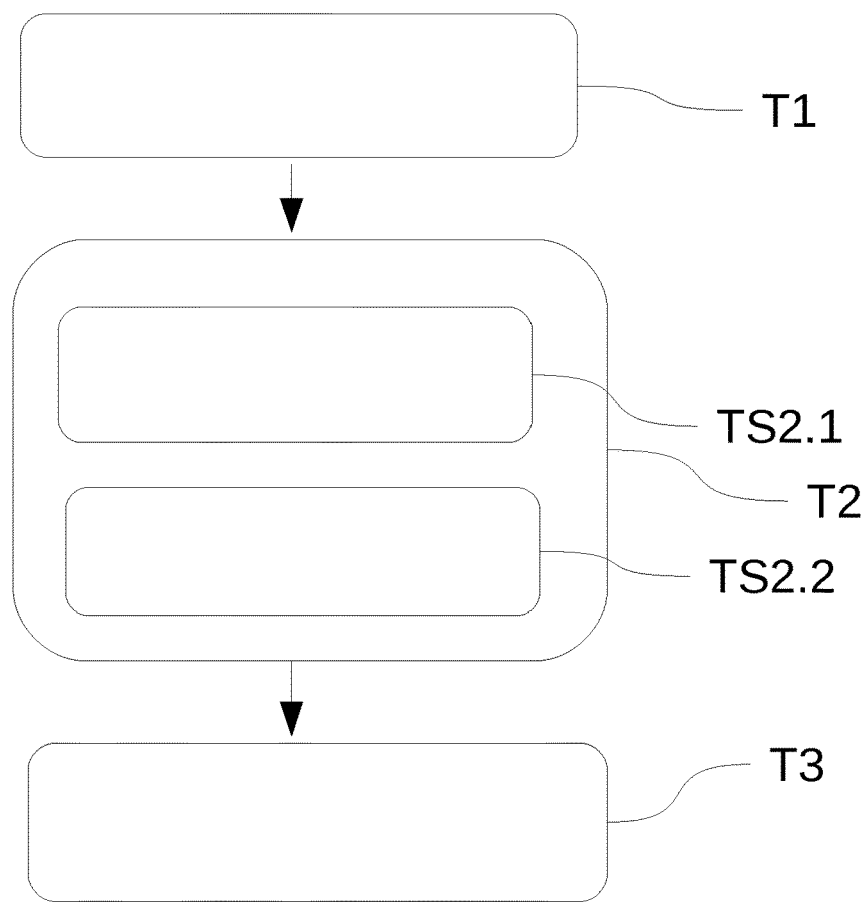
FIG. 4 illustrates steps of a second preferred embodiment of a method according to the invention.

As an alternative to programming a string programme code component using a conventional programming language, a string programme code component may also be programmed using natural language, as described below in more detail with regard to FIG. 4.

Figure 2:
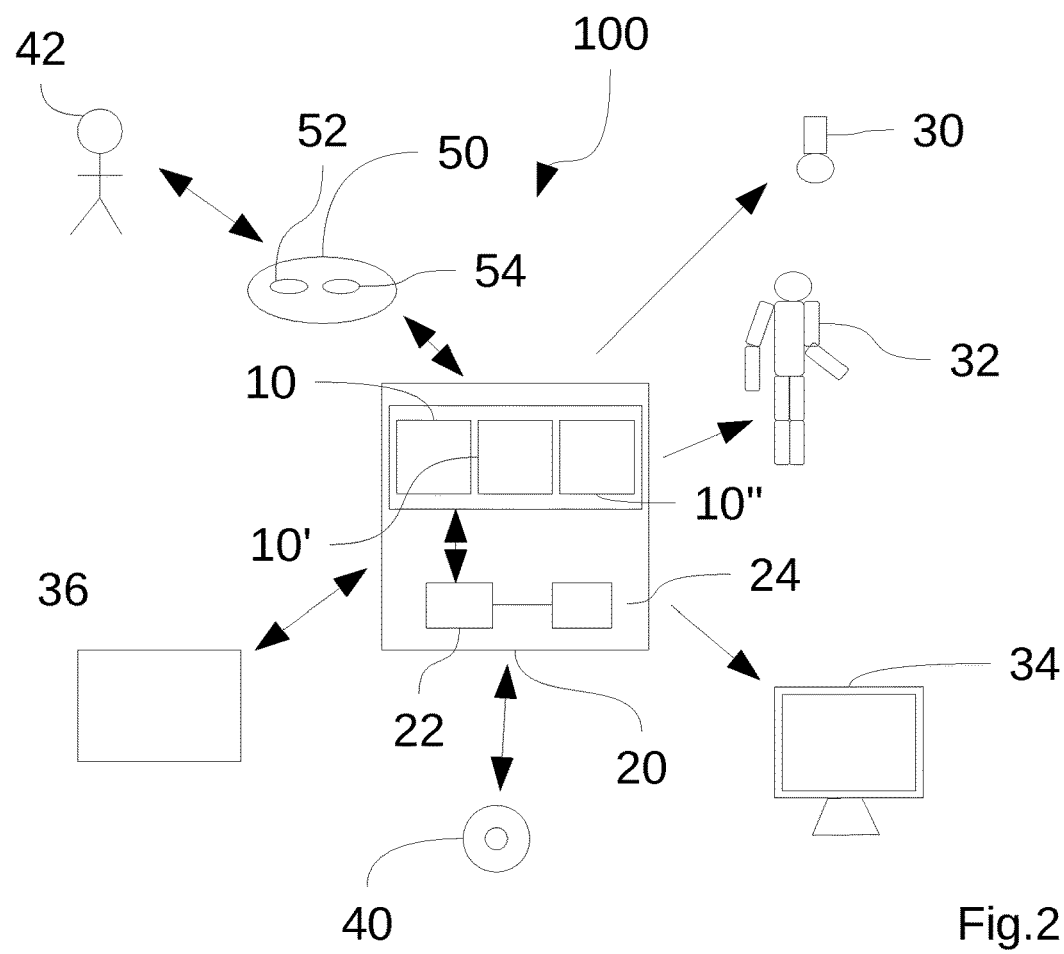
FIG. 2 schematically shows different components of a first preferred embodiment of a system according to the invention.

FIG. 2 exemplarily shows a system 100 where different string programme code components 10, 10', 10" are integrated. A user 40, 42 may communicate with the system using natural language and thus trigger the execution of different functionalities. Using these functionalities which are each implemented by the programme code segment of the string programme code components 10, 10', 10", particularly devices 30, 32, 34, 36 connected with the system 100 may be controlled, such as a lamp 30, a robot 32, a television 34 or an expert system 36. Regarding the user, both a human user 42 and a technical device 40 respectively configured are possible.

An interaction of individual components of the system is described in the following with regard to the FIGS. 3 and 4.

Figure 3:
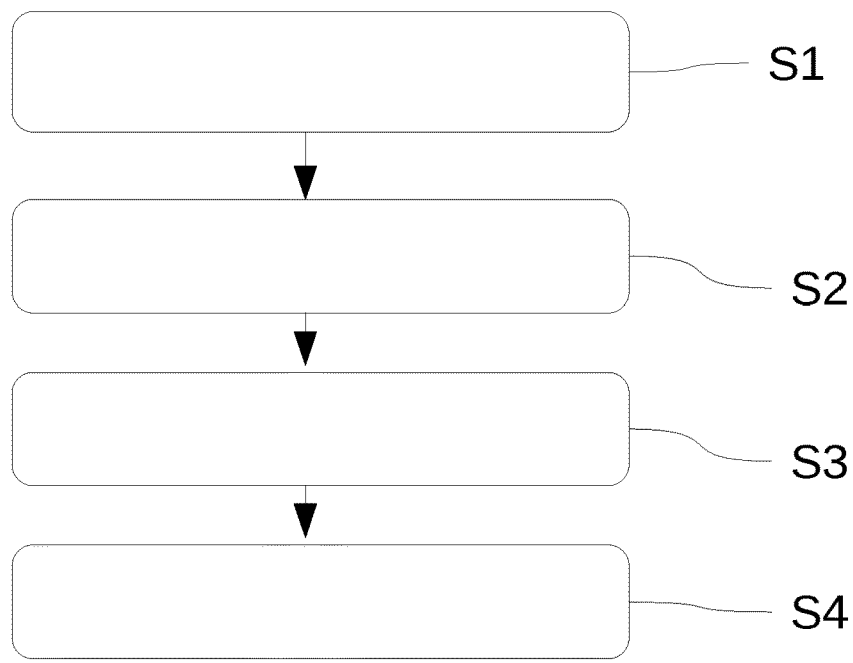
FIG. 3 illustrates steps of a first preferred embodiment of a method according to the invention using the system of FIG. 2.

In FIG. 3, steps of a first embodiment of a method for controlling a communication of a user 40, 42 with a system 100 are shown.

In step S1, at least one string programme code component 10 is provided in the system 100. The string programme code component 10 comprises a definition string 12 comprising an expression 13 in natural language, and a programme code segment 14 unambiguously assigned to the definition string 12 which implements a functionality assigned to the expression 13 in natural language.

The system 100 is configured to execute the functionality implemented by the programme code segment 14 upon receiving an input string which has a specified similarity to the definition string 12 according to a specified degree of similarity, as described below.

The system 100 comprises a control device 20. The control device 20 is configured to receive an input string comprising an expression in natural language. The control device 20 is further configured to compare the input string to a definition string 12 of a string programme code component 10 according to the specified degree of similarity, to execute a functionality implemented by a programme code segment 14 or the concerned string programme code component 10 if the input string has the specified similarity to the definition string 12 according to the specified degree of similarity.

In step S2, an input string is received by the control device 20, for example in the form of the natural-language expression "Please switch on the television" from the human user 42. The input of an input string may be supported using an input device 50, 52 which is configured, for example, to capture a sentence spoken by the user 42 "Please switch on the television", e.g., using a microphone, and to translate it into a respective string, e.g., using a conventional voice recognition software. The translated string, "Please switch on the television", is then sent by the input device 50, 52 to the control device 20 as an input string.

In step S3, the control device compares the input string to a definition string of one or more string programme code components 10, 10', 10" according to a specified degree of similarity.

A comparison of expressions in natural language may be performed using conventionally known pattern matching methods, for example.

With regard to the example illustrated in FIG. 2, it is assumed that a string programme code component 10 is integrated into the system 100 which comprises the definition string 12 with the natural-language expression "Switch on the television". This definition string 12 is assigned to a respective programme code segment 14 which implements a functionality for switching on the television 34 which is connected with the system 100.

A comparison of the input string "Please switch on the television" with the definition string "Switch on the television" indicates that the input string completely comprises the definition string which is interpreted as sufficient similarity herein.

It should be understood that different degrees of similarity and different comparison methods for comparing strings each comprising expressions in natural language may be used. Such methods which are not the subject matter of the present invention are known to the person skilled in the art. Furthermore, it is known that expressions to be compared may suitably be facilitated for comparing, for example, by omitting filler words (which have no content in this context), such as "please", articles and the like. Additionally, expressions to be compared may be facilitated regarding grammar, for example, by indicating verbs only in their basic form.

If, as in the case above, the input string "Please switch on the television" has the specified similarity to the definition string "Switch on the television" according to the specified degree of similarity, the control device executes the functionality implemented by the respective programme code segment 14 in step S4, whereby the television 34 is switched on.

In the event that no sufficiently similar definition string of a string programme code component can be found in step S3, the control device 20 may indicate this to the user in a suitable way. However, if the system finds a plurality of definition strings, each of them having a certain similarity to the definition string, this may be output to the user. In this case, the user may have the possibility to select the string programme code component which he considers best for his input string based on the respective definition string.

Alternatively, an input string with an expression in natural language may also be created by an input device, for example, a brightness sensor 40, and sent to the control device 20. For this purpose, if the input device 40 recognises, for example, that the brightness in a room decreases, for example, in the evening or in the event of a very cloudy sky, it may create an input string in the form of "it is dark" and send it to the control device 20. Then, this may scan the string programme code components 10, 10', 10" integrated into the system, as explained previously, as to whether one of these string programme code components has a definition string with a sufficient similarity. If so, the control device 20 may execute the functionality unambiguously assigned to this definition string with the possible result that the lamp 30 connected to the system 100 is switched on. It may be further provided that the device 40 does not automatically transmit this input string to the control device 20 but only, when a respective query is received by the control device 20.

Alternatively to the control of technical devices, the programme code segments 14 of the string programme code component 10 may advantageously be used to implement a functionality which permits a conversation between a user 42 and the string programme code component 10. Particularly within the context of expert systems, for example, in the medical field, this may advantageously be employed. The following example only intends to indicate this very briefly and exemplarily.

An expert system 36 may communicate with a user 42 using string programme code components 10, 10', as described below. For example, the user 42 may contact the expert system 36 via the control device 20 using the expression "I think I'm ill". The control device 20 compares the input string comprising this expression to definition strings of present string programme code components 10 and, for example, finds a definition string 12 of a string programme code component 10 with the expression "I'm ill". The programme code segment 14 of this string programme code component 10 implements a conversation with the user 42, for example, as follows:

User: "I think I'm ill"
System: "What's the matter? You got a fever?"
User: "yes"
System: "How high is the fever?"
User: "38.5"
System: "How long have you had fever?"
User: "Since noon today"
System: "Do you have other symptoms?"
User: "No"
System: "Then relax. Maybe you will feel better tomorrow."

The outputs of the system may be output via a suitable output device 50, 54, for example, a speaker 54, in natural language for the user. Alternatively, the questions and hints may be displayed on a monitor.

The string programme code component 10 which has been retrieved using the input string "I think I'm ill" implements a conversation which retrieves the general health status of the user. If there are no anomalies, the conversation may be terminated as shown. However, in the event that the conversation is as follows:

...
System: "What's the matter? You got a fever?"
User: "yes"
System: "How high is the fever?"
User: "39.5"
System: "How long have you had fever?"
User: "For three days."
System: "Do you have other symptoms?"
User: "Yes, headache and body aches, rhinitis and coughing", the programme code segment 14 of the string programme code component 10 may be formed such that the conversation is as follows:

System: "Your symptoms may indicate a flu" . . . .

At the same time, the functionality of the string programme code component 10 currently executed may be configured to transmit an input string with the expression "flu" to the control device 20. In order to analyse the health status of the user 42 regarding the suspected presence of a flu using an independent string programme code component 10' which is intended for this purpose, the functionality of this string programme code component 10' may be retrieved. Using a suitable conversation, these functionalities may ask for further information regarding the health status of the user and provide corresponding proposed actions.

Typically, the string programme code component 10' which has the definition string with the expression "flu" may access such information which have been retrieved by the previous string programme code component 10 (fever, how high, how long, further symptoms). Respective questions which are generally provided in the functionality may be omitted. Thus, it remains transparent for the user that the one string programme code component 10 indirectly retrieved another string programme code component 10'.

As mentioned several times, a string programme code component may also be programmed by a user using natural language, as shown below exemplarily and initially simplified using a very simple example with regard to FIG. 4. Programming in natural language is described in the following in detail with regard to the FIGS. 5 and 6.

In a first step T1, a plurality of string programme code components 10; 10'; 10" is provided within the system 100. This string programme code components are the basis for programming in natural language of a further, new string programme code component.

With regard to the system 100 in FIG. 2, it is assumed that different string programme code components 10, 10', 10" are already provided in the system, for example, a string programme code component 10 for switching on the television 34. This comprises a definition string 12 with the expression "Switch on the television" and a programme code segment coupled to it which implements a functionality for switching on the television 34.

A further string programme code component 10' serves for adapting the brightness and lighting within the room and comprises the definition string "Check brightness". The programme code segment 14 of this string programme code component 10' implements a functionality which sends a query to the brightness sensor 40 to transmit a current brightness value in the form of an input string (comprising an expression in natural language) to the control device 20. As mentioned previously, there may be another string programme code component 10" within the system 100 which processes this input string and, for example, switches on the lamp 30 upon receiving an expression of the form "it is dark", or actuates a darkening device, for example, a shutter (not shown), in response to an expression "it is very bright".

Then, in step T2, the user 42 defines a new string programme code component using a plurality of string programme code components 10; 10', 10" already provided within the system, as follows:

In a first substep TS2.1, the user 42 now indicates a new definition string for the new string programme code component to be defined which comprises an expression in natural language. In the present example, this definition string may, for example, comprise the expression "I would like to watch television".

I a further substring TS2.2, the user indicates a string sequence ("programming string") for defining the programme code segment of the further string programme code component to be defined newly. The strings of the string sequence each comprise an expression in natural language. If a string of the string sequence according to the specified degree of similarity has a specified similarity to a definition string of a string programme code component 10 of the plurality of string programme code components 10; 10'; 10", i.e., if the "programming string" comprises at least one substring of the definition string of the string programme code component 10, the programme code segment of the string programme code component to be defined newly is extended by the programme code segment 14 of the string programme code component 10 of the plurality of string programme code components 10; 10', 10".

Specifically, the string sequence (programming string) in the present case may be as follows ("Check the brightness", "Switch on the television"). The string "Check the brightness" comprises the expression "Check brightness" of the definition string 12 of the string programme code component 10' explained previously. Consequently, the programme code segment (which is still empty) of the string programme code component to be defined is supplemented by the programme code segment of the string programme code component 10'. In a similar manner, the programme code segment of the string programme code component to be defined is additionally supplemented by the programme code segment of the string programme code component 10 as the string "Switch on the television" comprises the expression "Switch on television" of the definition string 12.

In a final step T3, the string programme code component defined newly, as described above, is integrated into the system 100.

If the user 42 now contacts the system 100 using the expression "I would like to watch television", the functionality of the string programme code component defined newly is retrieved. This checks the brightness using a query to the brightness sensor 40. Depending on the input string received by the system 100 ("it is dark", "it is very bright"), the lamp 30 is optionally switched on or a shutter is lowered. Eventually, the television 34 is switched on.

It should be understood that sequences which are significantly more complex may be programmed using such a method, only using natural language and using string programme code components already present. Particularly, even control structures, such as branching, conditional statements, loops, etc., may be implemented in the form of string programme code components, preferably at the beginning of the process, as basic components and using a conventional programming language. These basic components may then be used as part of a subsequent programming of new string programme code components using natural language.

Without further explaining this in detail, a new string programme code component with the definition string "I would like to watch television" could be defined alternatively to the example above using the following string sequence:

"If I'm in the office,
switch the brightness of the room lighting to full moon night.
Lower the shutters and
switch on the television in the office.
If I'm in the living room,
switch on the television in the living room."

This example assumes that there are already string programme code components within the system which implement a conditional statement ("If . . . ") as well as a location of the user ("in the living room . . . ", "in the office"), an adjustable actuation of the lighting ("switch the brightness of the room lighting to full moon night") and the shutter ("Lower the shutters") and an actuation of different televisions ("switch on the television in the office", "switch on the television in the living room"), and accessible via respective definition strings.

Figure 5:
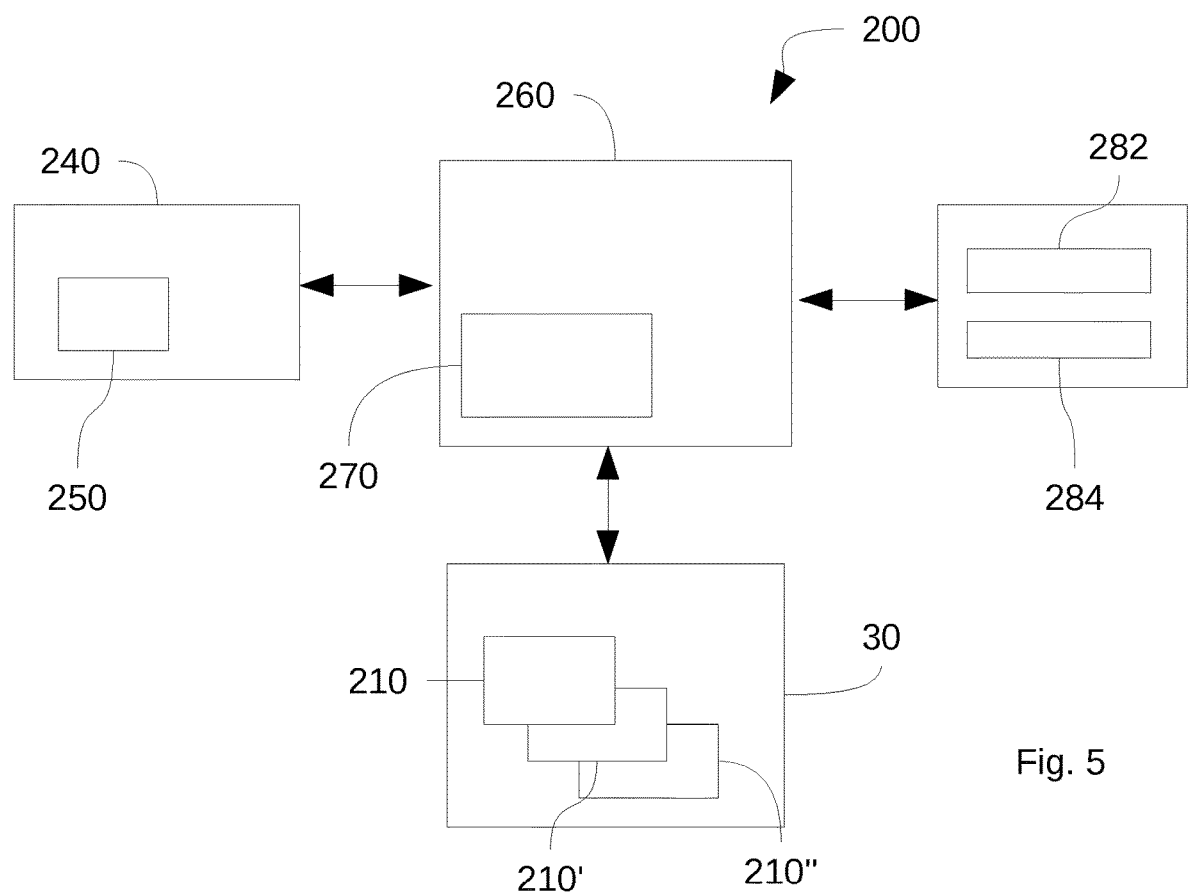
FIG. 5 shows components of a second preferred embodiment of a system according to the invention for programming in natural language.

In FIG. 5, components of a system 200 are depicted schematically which permits programming in natural language.

In the present context, programming in natural language is based significantly on a data structure which is known as string programme code component and which has already been described previously.

The system 200 comprises a control device 260 with a storage area 270, an input device 240, a storage area 230 as well as a code generator 282 and a compiler 284. Tasks and functionalities of the individual components are explained below.

The input device 240 is used for inputting an input into the system by the user of the system. The input is made, as shown below, in natural language using a programming string in natural language, such as "Add two numbers". The input may be made via a keyboard or the like or via voice input.

The input device 240 comprises an editor 250 which, as shown below, supports a communication of a user with the system 200. The editor 250 typically comprises an output device, e.g., a display where the input of the user as well as outputs of the control device 260 may be output.

A string programme code component 210, 210', 210" has already been described with regard to FIG. 1.

The mode of action and the advantages of the use of a process 16 for parameter input are evident below with regard to a simple example.

A string programme code component implements a process "collectParameterQ" for creating and collecting the parameters. In this example, the programme code segment of the string programme code component implements a functionality for outputting the time at one or more places which may be input as parameters:

```
public class WhatTime: SentenceComponent
{
    public:
        String getSentence( );
        String collectParameter(String *sentence,
                               String *suggestions,
                               String receivedWord);
        /* Markierung:    nameRueckgabe =>
                          "aktuelle Zeit der Städte" */
        String excecuteCodesegment( );
    Private:
        List<String> selectedCities;
}
public String WhatTime:: getSentence ( )
{
    return "Wie spät ist es in den folgenden Städten?"
}
```

The process 16 for parameter input has the following form:

```
public String WhatTime::collectParameter(String *sentence,
                                          String *suggestions,
                                          String receivedWord);
{
    if (!sentence.isEmpty( ))
    {
        sentence = "Wie spat ist es";
        return "ok";
    }
    if (sentens.endsWith("?"))
    {
        sentence.replaceLastCommaWith(" und ");
        return "EndOfSentence";
    }
    if (receivedWord == „Schweiz"))
    {
        selectedCities.add(„Schweiz")
        sentence = sentence + „in der Schweiz";
        return „ok";
    }
    else if (receivedWord == „Malta"))
    {
        selectedCities.add(„Malta")
        sentence = sentence + „auf Malta";
        return „ok";
    }
    else if (receivedWord == „London"))
    {
        selectedCities.add(„London")
        sentence = sentence + „in London";
        return „ok";
    }
    else
    {
        suggestions = "(Suggestion: Paris),
                       (Suggestion: London),
                       (Suggestion: Schweiz),
                       (Suggestion: Malta)";
        Return "(Error: Ihr Angabe ist falsch!)";
    }
}
public String WhatTime::excecuteCodesegment( ) {
    String timeInCities = "Die Ausgabe der Uhrzeit für
                           folgende Städte: ";
    for(int i; sizeOf(selectedCities) < i; i++)
    {
        timeInCities = timeInCities + selectedCities[i] + ": " +
            Date.getTime(selectedCities[i]).toString( );
    }
    return timeInCities;
}
```

If "what time" is input as programming string or input string, e.g., via an editor, the system will look for a match via a matching algorithm in the amount of present string programme code components—and find a partial match with the definition string of the string programme code component previously indicated: "What time is it in the following cities?" Subsequently, the system retrieves the process "collectParameter" of this string programme code component.

Based on the following programme code, the process collectParameter checks whether the sentence starts correctly, if not, it will be correct:

```
if (!sentence.isEmpty( ))
{
    sentence = „Wie spät ist es";
    return „ok";
}
```

Using the return value "ok", the editor tells the systems that the indication is correct. The system itself provides the content of the argument "sentence" to the editor. The editor depicts the correction and waits for the input of the user. If the user indicates the word "Switzerland", the editor transmits this input to the system. The system assigns the word "Switzerland" to the argument "receivedWord" and retrieves the process "collectParameter".

Based on the following programme code, the process 16 for parameter input corrects the grammar and adds an entry in the list of the selected cities:

```
if (receivedWord == „Schweiz"))
{
    selectedCities.add(„Schweiz")
    sentence = sentence + „in der Schweiz, ";
    return „ok";
}
```

Thus, the statement "What time is it in Switzerland" is depicted in the editor.

Assuming, the user indicates "Matta", the process "collectParameter" is retrieved again. As the word "Matta" is no valid city, an error message is created by the following programme code of the process 16 for parameter input, and some proposed corrections are transmitted to the system:

```
else
{
    suggestions = "(Suggestion: Paris),
                   (Suggestion: London),
                   (Suggestion: Schweiz),
                   (Suggestion: Malta)";
    Return "(Error: Ihr Angabe ist falsch!)";
}
```

The system transmits the error message and proposals to the editor. The editor outputs the error message and the proposals:

Then, the user corrects his statement with "Malta", and the editor transmits the corrected input to the system. The controller assigns the word "Malta" to the "receivedWord" and retrieves the process "collectParameter" again. By the following programme code, a further entry in the list of the selected cities is added, and the sentence is corrected regarding grammar:

```
else if (receivedWord == „Malta"))
{
    selectedCities.add(„Malta")
    sentence = sentence + „auf Malta";
    return "ok";
}
```

Now, the sentence looks as follows: "What time is it in Switzerland, in Malta". With the question mark, the user indicates the end of the sentence. The editor sends this input to the system. The process "collectParameter" is retrieved again. Using the following programme code, the sentence is corrected again regarding grammar, and using the return value "EndOfSentence", it is indicated to the system that the parameter input has ended.

```
if (sentens.endsWith(„?"))
{
    sentens.replaceLastCommaWith(„ und ");
    return "EndOfSentence";
}
```

The system sends the content of the argument "sentence" to the editor. The editor shows the sentence and waits for the indications by the user.

| NSC Programming Editor | Add breakpoint | ←Forward Backward → |
|---|---|---|
| What time is it in Switzerland and in Malta? | | |

Alternatively to the use of a process 16 for parameter input, an input of parameters may also be done in a different way using the control device 260. For this purpose, a process of a string programme code component is marked, for example, using the flag "partOfSentence". The process has an input parameter and no return value.

```
/* Markierung: partOfSentence = „eine Zeichenkette" */
void setOutput( String output );
```

In this way, the string programme code component 210 tells the control device 260 to interpret a part of the definition string as a parameter and to undertake capturing the parameter. Then, the captured parameter has to be assigned to this process by the code generator 282 (in the following, the term "SentenceComponent" instead of "string programme code component" appears in the programme code examples indicated exemplarily which is to be understood as a synonym).

```
public class PrintText: public SentenceComponent {
    public:
        String getSentence( );
        void executeCodesegment( );
        /* Markierung: partOfSentence = „eine Zeichenkette" */
        void setOutput ( String output );
    private:
        String outputString;
}
public void PrintText:: setOutput( String output ){
    outputString = output;
}
public PrintText:: getSentence ( ){
    return „gebe eine Zeichenkette auf dem Bildschirm aus."
}
public String PrintText::executeCodesegment( ) {
    println( outputString );
}
```

If the new string programme code component 210 "Output a string on the display" shown above is integrated into the system 200, it will by entered into a registration table after an analysis. Using the flag captured during the registration, the control device 260 recognises that the value of the part of the sentence, a "string", has to be assigned to the process "setOutput(String output)" as an argument.

If a new string programme code component 210 is generally integrated into the system 200, this may be analysed by a meta data analyser (not shown) and the respective meta data are maintained for further use.

The meta data include, e.g., class name, basic classes, processes and variables. For example, if a string programme code component is supplied in C++, it will be searched for a class by parsing the included declaration of the class and its process which implements the abstract class "SentenceComponent". Thus, a C++ meta data analyser recognises the class as string programme code component. The process "getSentence" is retrieved, and the definition string, including the class name, is entered into a meta data table. Thus, the string programme code component is integrated into the system and may be used for programming in natural language. Meta data analysers which are available for any common programming language, possess techniques which enable to obtain any information regarding public elements of a string programme code component. For C++, the declaration file of the string programme code component is parsed in order to get meta data. Modern, conventional programming languages provide this technique. In Java, for example, any meta data of a class are provided by "reflection".

A string programme code component 210 for outputting the current time may have the following form, for example:

```
public class LocalTime: SentenceComponent {
    public:
        String getSentence( );
        Time executeCodesegment( );
}
public String LocalTime:: getSentence ( ){
    return „Wie spät es ist?"
}
public String LocalTime::executeCodesegment( ) {
    return Date.getTime( );
}
```

The meta data of the process executeCodesegment ( ) in the programming language C++ may thus be as follows:
Programming language=C++
Header file=WhatTime.h
Class name=WhatTime
Process name=executeCodesegment
Type of return value=Time
Arguments=none The meta data analyser also provides the meta data for the return value "Time":
Programming language=C++
Header file=time.h
Class name=Time Thus, the meta data analyser and the control device have all meta data information of a string programme code component.

The process executeCodesegment( ) generally serves for implementing the current functionality of a string programme code component 210, for example, outputting a string captured as a parameter or adding two numbers.

Figure 6:
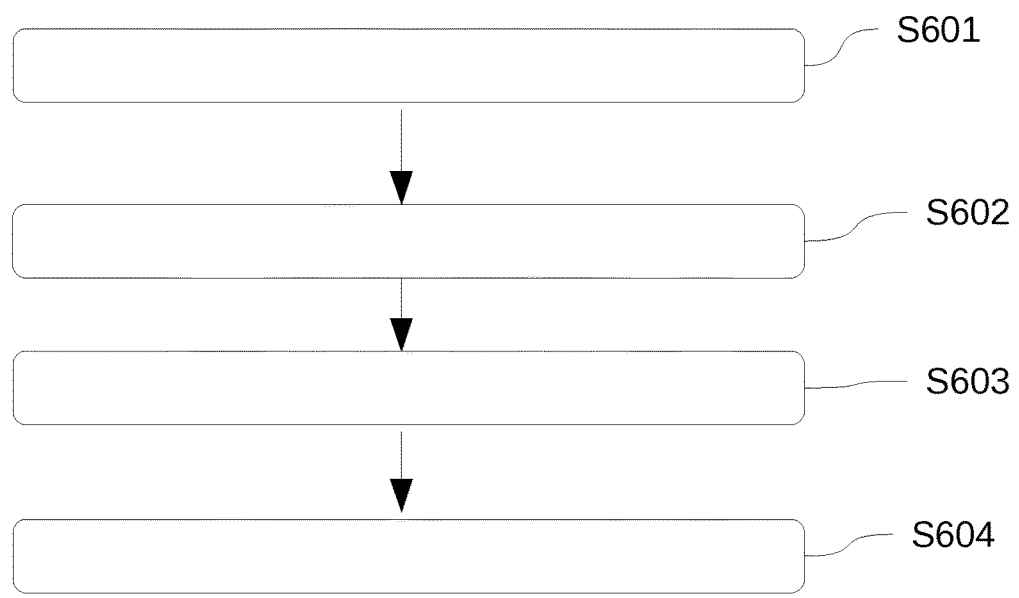
FIG. 6 illustrates steps of a third preferred embodiment of a method for programming in natural language using a system of FIG. 5.
Figure 7:
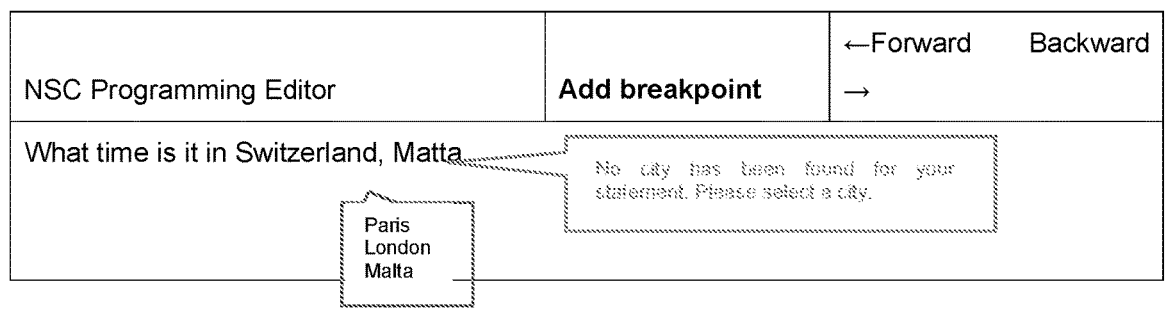
FIG. 7 illustrates is a representation an error message and proposed modifications for an editor.

A method for programming in natural language is explained in the following, in greater detail than with regard to FIG. 4, exemplarily using a further simple example with regard to FIG. 6.

In a first step S601, a plurality of string programme code components 210, 210', 210" is provided and registered in the system 200, as described previously, such as the string programme code components for providing the current time or for outputting a string on a display.

In a second step S602, a user of the system 200 inputs a programming string in natural language into the system 200 via the input device 240.

For example, the programming string may begin with "What time . . . ".

The control device 260 recognises the input and continuously compares the portions of the programming string already input to the definition strings of string programme code components 210, 210', 210" present in the system. In the present example, the control device 260 would recognise that there is a string programme code component 210 with the definition string "What time is it?", and would propose this string programme code component for use to the user. For example, this proposal could be output via the editor 250. In the present example, the user applies this proposal.

The string programme code component with the definition string "What time is it?" is thus selected as the programming string "what time . . . " comprises at least a substring of the definition string.

The programming string is then supplemented to "what time is it?". Programming in natural language may be continued, for example, by the user inputting "output . . . ".

The control device 260 recognises a new definition string which partially matches this programming string, namely "output a string on the display", and proposes the use of the respective string programme code component. If the user accepts which is the case, the control device 260 assumes, as described previously, capturing the parameter "a string" and expects that the user either enters a string enclosed in apostrophes or a variable of the data type "string". The user enters the "current time" (the return value of the string programme code component "What time is it?"). Then, the programming string is supplemented to:

"What time is it? Output the current time on the display."

At this point, there are two advantageous aspects of the described method. String programme code component may return values (an indication of time which indicates the current time). Such return values may be stored by the system 200, e.g. in a memory 270. Preferably, such return values are annotated using natural language, in the present case, with "current time". In this way, subsequent string programme code components may not only generally but easily, use such return values using natural language by specifying the parameter "a string" by the natural-language expression "current time".

The previous example also shows that the steps of inputting the programming string as well as selecting a string programme code component may alternate several times. Furthermore, a parameter query and input during inputting and/or after inputting the programming string may be required.

In the event that the user signalises that the input of the programming string is completed, in step S604, a programme assigned to the programming string is created based on the programme code segment of the selected string programme code component.

For this purpose, the code generator 282 generates, e.g., the following programme code for both string programme code components:

```
#include "WhatTime.h"
#include "PrintText.h"
WhatTime whatTime_1= new WhatTime ()
String result_1 = whatTime_1.excecuteCodesegment( );
PrintText printText_1 = new PrintText( )
printText_1.setOutput( result_1 );
printText_1.excecuteCodesegment( );
```

The variable result_1 corresponds to the return value "current time" of the string programme code component "what time is it?". The corresponding C++ compiler 284 compiles the programme code above and puts it as an executable file into an intended memory (not shown) of the system 200. If the executable file is executed, the current time is displayed on the display. The arithmetic calculations may be indicated using a programming string in natural language, for example, in the form "Add 20 to 5 and take the root of the addition result", or even—as usual in mathematics—via a mathematical notation. For example, as follows:

Addition result=20+5

Root result=√Additionresult

Apart from the graphical representation of any mathematical symbol, it is possible to use results obtained before as variables in formulas for the further calculation. The results may also be used as parameters in the subsequent string programme code component.

It should be understood that the programming language where the programme code segments of the individual string programme code components are created may be different from the programming language where the code generator creates the programme code for the programme programmed using natural language as described before. If both programming languages are different, the code generator adds mechanisms in the programme code of the target programming language which enable to retrieve the programme code segments in the foreign programming language, for example, via a proxy.

As already mentioned, the system may comprise code generators and compilers for different target programming languages (C++, C#, Java, etc.) and execution platforms (Windows, Linux, Android, etc.) which may optionally be used by the user.

In the following, further aspects of the method described herein are described exemplarily.

Control structures, particularly conditional statements, are essential components of conventional programming languages. As shown exemplarily below, such control structures may be provided with full functionality using the method for programming in natural language proposed herein. Conditional statements are also implemented as string programme code components. For this purpose, the process executeCodesegment( ), e.g., in the event of an IF statement, may be flagged with the flag controlFlow="IF". Thus, the code generator 282 is instructed to enter the process executeCodesegment( ) as a condition of an IF statement:

```
if ( classX.executeCodesegment( ) ){
    // hier wird durch Codegenerator der
    // Source Code anderer Zeichenketten-Programmcode-Komponenten
    // eingetragen.
}
```

Generic conditions of the form "a<b" may be implemented easily such that the corresponding string programme code component has a process for retrieving parameters which is configured to query operands and operator of such a condition during programming in natural language. The number and type of operands and operators may vary and also be queried during programming. In this way, any conditional statement may be formed.

String programme code components also permit to verify conditions which do not follow the generic scheme but are more like natural language, for example, a condition of the form "if it is bright outside, then . . . ". For example, this may be realised using a string programme code component as follows:

```
public class MyFirstIF: SentenceComponent {
    public:
        String getSentence( );
        /* Markierung:    controlFlow = "IF" */
        boolean executeCodesegment( );
}
public String MyFirstIF:: getSentence ( ){
    return "Wenn es draußen hell ist, dann ..."
}
```

-continued

```
public boolean MyFirstIF:: executeCodesegment( ){
    OutdoorBrightnessSensor sensor = new OutdoorBrightnessSensor( );
    boolean brightness = sensor.isBright( );
    if ( brightness == true ){
        return true;
    }
    else {
        return false;
    }
}
```

The class "OutdoorBrightnessSensor" relates to an outdoor light intensity sensor. The method "isBright( )" measures the brightness and returns "true" if the brightness is not below a specified intensity.

The code generator creates the following programme code in C++:

```
#include "MyFirstIF.h"
MyFirstIF myFirstIF _1 = new MyFirstIF ( );
if (myFirstIF _1.executeCodesegment( ) ){
    // hier wird durch Codegenerator der
    // Source Code anderer Zeichenketten-Programmcode-Komponente
    // eingetragen.
}
```

If the process executeCodesegment( ) returns a Boolean logical value of "true", the statements are executed within the block. These statements originate from string programme code components which are selected due to a programming string entered after the term "then".

According to a further aspect, a subset of string programme code components may technically be combined in a module. When registering a module in the system, any string programme code component in the meta data table contained within this module, are combined into a group.

| Definition string | Group | Class |
|---|---|---|
| Create an application | Application1 | MyApplication |
| Insert an input field | Application1 | MyTextField |
| Insert a button | Application1 | MyButton |

Any string programme code component within a group know the interfaces of the other string programme code components. Between the string programme code components of a group, implied relationships may be assumed. The string programme code component "Insert an input field" is implicitly related to the string programme code component "Create an application"; accordingly, a created input field of the created application is assigned, without being required to explicitly determine a parameter to be entered. Furthermore, due to the grouping, the control device 260 may implicitly assign a return value of a first string programme code component to a subsequent string programme code component in the same group.

A further aspect which may also be captured using programming in natural language in the form proposed herein is parallel processing of different tasks.

Regarding the control of complex systems, for example, the control of a humanoid robot, it is often required that several programme sequences are executed at the same time. These are several processes for the general handling of a task. Parallelisation of programme sequences may easily be realised in modern programming languages. For example, for programming a process in Java, the abstract class "Thread" is provided with the only process run( ) for implementing a programme code to be executed in parallel.

```
Public MyThread_1 implements Thread{
    public void run( )
    {
    }
}
```

In order to generate a process, a new class has to be created which implements the abstract class Thread and its process run( ). Afterwards, an instance of the class has to be created, and then, the process start( ) of the class "Thread" has to be retrieved.

For example, for a string programme code component with the definition string "Lower the shutters", the following programme code is generated, under the condition that its class name is "JalousieDown":

```
Public MyThread_1 implements Thread{
    public void run( )
    {
        JalousieDown jalousieDown_1 = new JalousieDown( );
        jalousieDown_1.executeCodesegment( );
    }
}
```

By the following string programme code component, indicated by the definition strings, a simple parallel task may be realised.

Do the following in parallel:
switch the brightness of the room lighting to full moon night.
Lower the shutters By inputting the definition string "Do the following in parallel", the Java code generator creates a process for each string programme code component and adds the respective string programme code component within the process run( ).

```
Public MyThread_1 implements Thread{
    public void run( )
    {
        LightDeamer lightDeamer_1 = new LightDeamer( );
        lightDeamer_1.setLight( "Vollmondnacht" );
        lightDeamer_1.executeCodesegment( );
    }
}
Public MyThread_2 implements Thread{
    public void run( )
    {
        JalousieDown jalousieDown_1 = new JalousieDown( );
        jalousieDown_1.executeCodesegment( );
    }
}
MyThread_1.start( );
MyThread_2.start( );
```

Thus, both string programme code components, i.e., the functionalities implemented by the respective programme code segments, are executed at the same time by executing the process start( ).

As mentioned several times, using the described method, there is also the possibility to create new string programme code components from existing string programme code components. In order to create a new string programme code component, one or more fundamental string programme code components are indicated for a new definition string. For the new string programme code component, the code generator 282 creates a process "getSentence" for returning the new definition string and a process "executeCodesegment( )" for implementing a functionality which is a combination of the functionalities which provide the individual string programme code components used for creating the new string programme code component.

According to a very simple example which is only exemplary, a string programme code component for the new definition string "display time output" could be created, based on both string programme code components "what time is it?" and "output a string on the display" already explained.

A respective programming string may be, for example:
"Create a new string programme code component for the definition string D and the programming string P",
wherein D and P each corresponds to parameters of the string type.

The specification D="display time output", P="what time is it? output a string on the display", would have the desired effect:

A new string programme code component with the definition string "display time output" is created. The programme code segment corresponds to the programme code which is created by the code generator if the programming string "what time is it? output a string on the display" is input for programming in natural language, as described previously.

The invention claimed is:

1. A method for controlling a system using natural language, the system including a control device, a storage area, an input device, and at least one of a code generator and a compiler or a processor, the method comprising the step of:
providing a plurality of string programme code components within the storage area of the system, wherein each string programme code component of the plurality of string programme code components comprises:
a definition string comprising an expression in natural language, and
a programme code segment unambiguously assigned to the definition string which implements a functionality assigned to the expression in natural language,
receiving a programming string in natural language from an input device;
selecting, by the control device, a selected string programme code component from the plurality of the string programme code components if the programming string comprises at least one substring of the definition string of the selected string programme code component;
creating, by the code generator and the compiler, a programme assigned to the programming string based on the programme code segment of the selected string programme code component, or executing, by a processor of the system, the functionality implemented by the programme code segment of the selected string programme code component,
wherein several string programme code components from the plurality of the string programme code components are selected by the control device if the programming string comprises at least one substring of the definition string of each of the several selected string programme code components, wherein a programme assigned to the programming string based on the programme code segment of the several selected string programme code components is created or wherein the functionality implemented by the programme code segment of the several selected string programme code components is executed.

2. The method according to claim 1, wherein one functionality provided by the programme code segment of at least one of the string programme code components from the plurality of string programme code components, if this functionality is executed by the system, supplies a return value, wherein this return value is preferably annotated as natural language, and wherein at least one further string programme code component from the plurality of string programme code components, if the functionality provided by the programme code segment of this further string programme code component is executed by the system, accesses the return value, particularly as a parameter for specifying the functionality provided by the programme code segment of the further string programme code component, wherein the access to the return value based on an annotation of the return value as natural language can be made.

3. The method according to claim 1, wherein the programme code segment or the process for parameter input implements a dialogue between the string programme code component and a user, wherein the dialogue supports a conversation between the user and the string programme code component.

4. The method according to claim 1, comprising the further steps of:
comparing the received programming string to the definition string according to a specified degree of similarity by the system; and
wherein executing the functionality implemented by the programme code segment by the system includes executing the functionality if the input string has the specified degree of similarity to the definition string;
storing received input string;
further comprising the step of:
retrieving the stored input string for supporting subsequent executing of a functionality implemented by a programme code segment of a string programme code component, or further comprising the steps of:
inferring a context information from the input string using the functionality implemented by the programme code segment; and
storing the context information in the system.

5. The method according to claim 1, wherein at least one of the string programme code components from the plurality of string programme code components is configured to support a parameter input in a way that a part of the definition string of this string programme code component is characterised as a parameter to be specified.

6. The method according to claim 1, wherein a definable parameter type is assigned to a parameter, by means of which the functionality provided by the programme code segment of a string programme code component may be specified.

7. The method according to claim 1, wherein the programme code segment implements a control structure controlling a sequence of a programme in at least one of the string programme code components from the plurality of string programme code components.

8. The method according to claim 1, comprising a step of creating a new string programme code component based on several string programme code components from the plurality of string programme code components, wherein
a new definition string for the string programme code component to be created newly is indicated;

the several string programme code components are selected by inputting the programming string in natural language according to claim 1; and wherein a new programme code segment for the string programme code component to be created newly is created based on a programme code created in the step of creating the programme assigned to the programming string.

9. A system, configured to process natural language, comprising:

a control device, a storage area, an input device, and at least one of a code generator or a compiler or a processor, the storage area including instructions that, when executed by the code generator and the compiler or the processor, cause the system to:

receive in the storage area, a plurality of string programme code components, wherein each string programme code component of the plurality of string programme code components comprises:

a definition string comprising an expression in natural language, a programme code segment unambiguously assigned to the definition string which implements a functionality assigned to the expression in natural language, receive a programming string in natural language from the input device;

select at least one selected string code component of the plurality of string programme code components if the received programming string comprises at least one substring of the definition string of the selected string programme code component; and at least one of create a programme assigned to the programming string based on the programme code segments of at least one selected string programme code component; or execute the functionality implemented by the programme code segment of at least one of the selected string programme code components.

10. The system according to claim 9, wherein a functionality provided by the programme code segment of at least one of the string programme code components from the plurality of string programme code components is configured, if this functionality is executed by the system, to supply a return value, wherein this return value is preferably annotated as natural language, wherein at least one further string programme code component from the plurality of string programme code components is configured, if the functionality provided by the programme code segment of this further string programme code component is executed by the system, to access the return value, particularly as a parameter for specifying this functionality provided by the programme code segment of the further string programme code component, wherein the access to the return value based on an annotation of the return value as natural language can be made.

11. The system according to claim 9, comprising an input device which is configured to receive a trigger signal, particularly an environment signal sensed using a sensor of the input device, and in response to the trigger signal, to infer an input string depending on the trigger signal which comprises an expression in natural language, and to send it to the control device.

12. The method according to claim 1, wherein at least one of the string programme code components from the plurality of string programme code components comprises a process for parameter input, wherein this string programme code component is configured to support a parameter input by means of which the functionality provided by the programme code segment of this string programme code component may be specified.

13. The system according to claim 9, wherein at least one of the string programme code components from the plurality of string programme code components comprises a process for parameter input, wherein this string programme code component is configured to support a parameter input by means of which the functionality provided by the programme code segment of this string programme code component may be specified.

* * * * *